United States Patent
Benthien et al.

(10) Patent No.: US 10,087,981 B2
(45) Date of Patent: Oct. 2, 2018

(54) JOINT CONNECTOR, ROTARY JOINT, FRAMEWORK CONSTRUCTION KIT AND FRAMEWORK

(71) Applicant: AIRBUS OPERATIONS GMBH, Hamburg (DE)

(72) Inventors: Hermann Benthien, Hamburg (DE); Andreas Poppe, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 15/342,782

(22) Filed: Nov. 3, 2016

(65) Prior Publication Data

US 2017/0130766 A1 May 11, 2017

(30) Foreign Application Priority Data

Nov. 5, 2015 (EP) .................................... 15193131

(51) Int. Cl.
| | |
|---|---|
| *E04H 12/18* | (2006.01) |
| *F16C 11/04* | (2006.01) |
| *E04C 3/02* | (2006.01) |
| *B64C 1/18* | (2006.01) |
| *E04C 3/08* | (2006.01) |
| *E04C 3/29* | (2006.01) |

(Continued)

(52) U.S. Cl.
CPC ................ *F16C 11/04* (2013.01); *B64C 1/18* (2013.01); *E04C 3/02* (2013.01); *E04C 3/08* (2013.01); *E04C 3/291* (2013.01); *F16C 11/0661* (2013.01); *F16C 11/0695* (2013.01); *E04B 2001/1924* (2013.01); *E04B 2001/1969* (2013.01)

(58) Field of Classification Search
CPC .. F16C 11/04; F16C 11/0661; F16C 2202/36; F16C 2226/60; B64C 3/48; E04B 1/1906; E04B 1/1903; E04B 1/1909; E04B 2001/1957; F16B 7/182
See application file for complete search history.

(56) References Cited

U.S. PATENT DOCUMENTS

| | | | |
|---|---|---|---|
| 3,899,221 A | 8/1975 | Batt | |
| 4,161,088 A | 7/1979 | Gugliotta et al. | |

(Continued)

FOREIGN PATENT DOCUMENTS

| | | |
|---|---|---|
| CA | 2 237 020 A1 | 6/1997 |
| DE | 37 36 784 A1 | 5/1989 |

(Continued)

OTHER PUBLICATIONS

Extended European Search Report for Application No. 15 190 861.3 dated Aug. 11, 2016.

(Continued)

*Primary Examiner* — Patrick J Maestri
(74) *Attorney, Agent, or Firm* — Jenkins, Wilson, Taylor & Hunt, P.A.

(57) ABSTRACT

A joint connector ring includes a connector body formed as a hollow cylinder defining a hollow surrounding a connector opening, and an annular groove formed in a top surface of the cylindrical connector body as a trench running circumferentially around the cylindrical connector body and having an approximately constant depth within the connector body.

9 Claims, 6 Drawing Sheets

(51) Int. Cl.
  *F16C 11/06* (2006.01)
  *E04B 1/19* (2006.01)

(56) References Cited

U.S. PATENT DOCUMENTS

| | | | |
|---|---|---|---|
| 4,435,023 A | 3/1984 | Bolner | |
| 4,650,361 A | 3/1987 | Seuster | |
| 5,101,607 A | 4/1992 | Staeger | |
| 5,319,577 A | 6/1994 | Lee | |
| 5,711,709 A * | 1/1998 | McCoy | F16B 7/182 464/106 |
| 6,622,447 B1 | 9/2003 | Kessler | |
| 2005/0115186 A1* | 6/2005 | Jensen | A45F 3/04 52/633 |
| 2008/0238249 A1 | 10/2008 | Takahashi | |
| 2010/0054856 A1* | 3/2010 | Schalla | F16C 7/02 403/408.1 |
| 2010/0083605 A1 | 4/2010 | Wallner | |
| 2017/0114535 A1 | 4/2017 | Benthien et al. | |

FOREIGN PATENT DOCUMENTS

| | | |
|---|---|---|
| DE | 38 00 547 A1 | 7/1989 |
| EP | 0 147 669 A2 | 7/1985 |
| EP | 0 986 685 B1 | 3/2000 |
| EP | 1 358 392 B1 | 11/2003 |
| EP | 2 921 600 A1 | 9/2015 |
| FR | 901 628 A | 8/1945 |
| GB | 2 077 347 A | 12/1981 |
| WO | WO 2014/195868 | 12/2014 |

OTHER PUBLICATIONS

Extended European Search Report for Application No. 15193131 dated Apr. 25, 2016.
Non-Final Office Action for U.S. Appl. No. 15/297,596 dated Sep. 15, 2017.
Notice of Allowance for U.S. Appl. No. 15/297,596 dated Feb. 5, 2018.

* cited by examiner

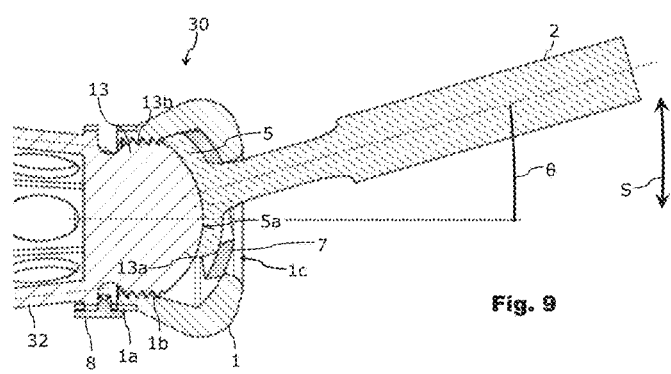
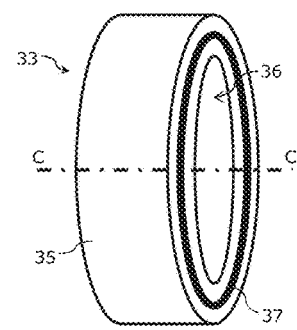
Fig. 9
Fig. 11
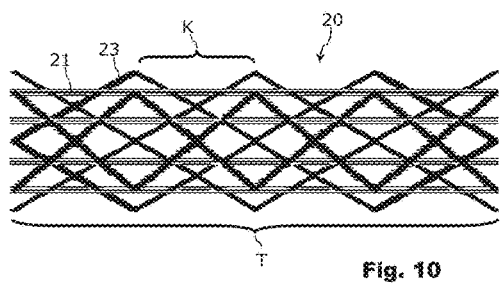
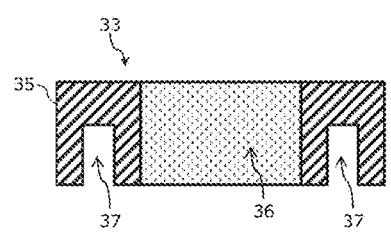
Fig. 10
Fig. 12

JOINT CONNECTOR, ROTARY JOINT, FRAMEWORK CONSTRUCTION KIT AND FRAMEWORK

CROSS-REFERENCE TO RELATED APPLICATION

This application claims priority to European Patent Application EP 15 193 131.8 filed Nov. 5, 2015, the entire disclosure of which is incorporated by reference herein.

TECHNICAL FIELD

The present disclosure relates to a joint connector ring, especially for rotary joints, a framework construction kit employing rotary joints with joint connector rings and a framework employing such rotary joints.

BACKGROUND

Beams, joists and frames for construction work, for example in aeronautics, civil engineering or architecture, are designed to withstand bending forces acting perpendicular to the direction of extension of the respective beams. Conventional beams may be implemented as an integral part with flanges at the edges and a web spanning between the flanges. Alternatively, instead of a web, cutter milled struts may be implemented between parallel running longitudinal support bars, thus leading to decreased weight of the beam due to less material being used to form the beam. Such struts may be employed in three-dimensional truss structures, as for example disclosed in documents EP 0 986 685 B1 or EP 1 358 392 B1.

Local load introduction into such beams or frames may, however, lead to torsional moments that are introduced into the attachment joints of the struts with the longitudinal support bars. Such torsional moments may in turn lead to additional moments within the longitudinal support bars that will have to be compensated for by local strengthening means, thereby nullifying some or all of the weight advantages gained.

Document U.S. Pat. No. 6,622,447 B1 discloses a modular structural system for building models and structures, using a plurality of connector hub members with spherical symmetry, and a plurality of strut members with longitudinal symmetry, wherein the strut members are removably engageable with the connector hub members placing the strut members in corresponding radial and tangential positions relative to the connector hub members.

Document CA 2 237 020 A1 and DE 38 00 547 A1 each disclose a set of structural elements for producing supporting structures, using supporting bars and cylindrical connecting elements for insertion heads provided on the end sides of the supporting bars.

Document DE 37 36 784 A1 discloses a node-truss system with rod-shaped elements which are pivotally connected to node bodies. Document U.S. Pat. No. 4,161,088 A discloses a pipe-and-ball truss array in which the outer chord of the truss array comprises an outer hollow pipe element having a structural tee element extending radially outward from the outer surface thereof in a plane normal to the plane in which the deck surface is to be supported on the truss array and an inner rod running through the pipe along the longitudinal axis thereof. A hollow substantially ball-like member, such as a hollow spherical member, is provided which is common to a plurality of truss members which truss members are joined to the spherical member by bolting.

Document US 2010/0083605 A1 discloses a truss with bar members that are connected by connection elements, with the bar members and the connection elements having plug-connection-structures such as annular tongues and annular groove).

SUMMARY

One of the ideas of the disclosure herein is to provide solutions for easier construction of frameworks that compensate additional torsional moments coupled into the joints of the frameworks in an efficient and weight saving manner, and that allow for a quick installation with a minimum number of individual parts to be mounted and fixed.

A first aspect of the disclosure pertains to a joint connector ring comprising a connector body formed as a hollow cylinder defining a hollow surrounding a connector opening, and an annular groove formed in a top surface of the cylindrical connector body as a trench running circumferentially around the cylindrical connector body and having an approximately constant depth within the connector body. The connector body may in one embodiment be cast from one of resin and metal by using an Additive Manufacturing, AM, technique.

A second aspect of the disclosure pertains to a rotary joint comprising a socket rod having a socket rod flange with an at least partly spheroid concave bearing surface at a first end, a housing nut encircling the socket rod and having a threaded wrenching head, and a ball rod having an at least partly spheroid convex bearing surface and threaded side walls around the bearing lo surface. A mounting shank is coupled to the socket rod or the ball rod with a shank end portion. At its end opposite to the shank end the mounting shank is equipped with a joint connector ring according to the first aspect of the disclosure which is fixedly connected to the mounting shank. The diameter of the threaded side walls of the ball rod corresponds to a diameter of the threaded wrenching head of the housing nut.

According to a third aspect of the disclosure, a framework construction kit comprises at least one rotary joint according to the first aspect of the disclosure, and at least one tubular interconnection strut connected to the joint connector ring.

According to a fourth aspect of the disclosure, a framework comprises a plurality of rotary joints according to the first aspect of the disclosure, and a plurality of interconnection struts, each connected to the joint connector rings of the plurality of rotary joints.

An idea on which the present disclosure is based is to improve the connection points of a framework made up of struts by employing rotary joints of a ball-and-socket type. The stationary connection part is formed by a single protruding ball rod that has an at least partly spheroid convex outer surface. The side walls of the ball rod around the convex outer surface are provided with a cylindrically threaded engagement surface for engagement with a housing nut. The movable connection part is formed by a socket rod that has an at least partly spheroid concave outer surface, the shape of the concave outer surface corresponding to the shape of the convex outer surface of the stationary connection part so that both connection parts may be brought in contact with each other and the touching convex and concave outer surface may move in a sliding manner with respect to each other, similar to a ball-and-socket connection.

In order to restrain the movable connection part to not detach from the convex outer surface of the stationary connection part a housing nut is slipped on the socket rod.

The housing nut has an inner thread on its inner walls corresponding to the cylindrically threaded engagement surface of the stationary connection part. The movable connection part has a generally tapered shape, i.e. the end portion with the concave outer surface is flanged with respect to the extending rod portion. The opening of the housing nut has a diameter that is larger than the diameter of the extending rod portion, but smaller than the diameter of the flanged end portion. Therefore, when the housing nut is threadingly engaging the threaded engagement surface of the stationary connection part, the housing nut clamps the flanged end portion between the rim of the housing nut opening and the stationary connection part so that the movable connection part will be secured against detachment from the stationary connection part, i.e. a linear movement of the movable connection part in the direction of the extending rod portion away from the stationary connection part will be mechanically restrained.

Along the contacting surfaces of the stationary connection part ("ball" part) and the movable connection part ("socket" part) a swivelling motion of the socket rod with respect to the attached structure of the stationary connection part may be realized. A lateral moment on the strut coupled to the socket rod with respect to the contacting surfaces of the rotary joint will lead to a shifting movement of the socket rod along the outer surface of the stationary connection part. Thus, any bending moment acting perpendicular to the orientation of the strut/socket rod will vanish with respect to the rotary joint due to the compensating sliding movement of the movable connection part with respect to the stationary connection part. This means in turn that the rotary joint will be essentially free of any bending moments that would otherwise be brought into the rotary joints. The axes of struts coupled to such rotary joints will always be oriented towards the centre of the rotary joint, thereby balancing out the rotary joint optimally under any loading situation on the struts.

Particularly advantageous may additionally be the reduction of costs, weight, lead time, part count and manufacturing complexity coming along with employing any kind of layer manufacturing technology when designing the components of the framework construction kit, specifically the rotary joints.

According to an embodiment of the rotary joint, the housing nut may have a nut hole on the opposite side of the threaded wrenching head, the diameter of the nut hole being larger than the diameter of the socket rod, but smaller than the diameter of the socket rod flange. This way, the socket rod flange is given enough leeway to swivel along the ball rod bearing surface, but is not able to detach from the ball rod perpendicular to its surface.

According to a further embodiment of the rotary joint, the curvature of the concave bearing surface of the socket rod flange may correspond to the curvature of the convex bearing surface of the ball rod. This enables the implementation of a smooth contact between the two movable parts, thereby reducing the inner friction within the joint.

According to a further embodiment of the rotary joint, the rotary joint may further comprise a sliding washer which is arranged between the socket rod flange and the inner walls of the threaded wrenching head. The sliding washer may have a diameter which is smaller than the diameter of the socket rod flange, thereby allowing for a greater maximum displacement angle between the socket rod and the ball rod.

According to an embodiment of the framework construction kit, the interconnection strut may comprises a trussed beam having a plurality of substantially longitudinally running chord members and a plurality of web members spanning between the chord members. Trussed beams, for example beams formed from an isometric framework of gridded framework members, are optimized for weight and load balancing, thereby being especially appealing to any aviation application.

According to an embodiment of the framework construction kit, the tube walls of the tubular interconnection strut may be inserted into the annular groove of the joint connector ring in a form-fit or press-fit arrangement. In a particular embodiment, the tubular interconnection strut may then be fixedly secured to the joint connector ring by resin, adhesive, glue or solidified liquid metal introduced into the annular groove. Alternatively, the tubular interconnection strut may be fixedly secured to the joint connector ring by a snap-lock mechanism. Snap-lock engaged interconnection struts allow for rapid construction and deconstruction of a framework with such rotary joints.

BRIEF DESCRIPTION OF THE DRAWINGS

The disclosure herein will be explained in greater detail with reference to exemplary embodiments depicted in the drawings as appended.

The accompanying drawings are included to provide a further understanding of the present disclosure and are incorporated in and constitute a part of this specification. The drawings illustrate the embodiments of the present disclosure and together with the description serve to explain the principles of the disclosure herein. Other embodiments of the present disclosure and many of the intended advantages of the present disclosure will be readily appreciated as they become better understood by reference to the following detailed description. The elements of the drawings are not necessarily to scale relative to each other. Like reference numerals designate corresponding similar parts.

FIG. 9 schematically illustrates a cross-sectional view of a rotary joint with the strut swivelled out of its baseline position according to yet another embodiment of the disclosure herein.

FIG. 10 schematically illustrates an exemplary geometric structure of a connection strut formed by an isometric truss according to yet another embodiment of the disclosure herein.

FIG. 11 schematically illustrates a perspective view of a joint connector ring used in one of the joint regions of FIGS. 2, 5, 6 and 7.

FIG. 12 schematically illustrates a cross-sectional view along the line C-C of FIG. 11.

DETAILED DESCRIPTION

Figure 1:
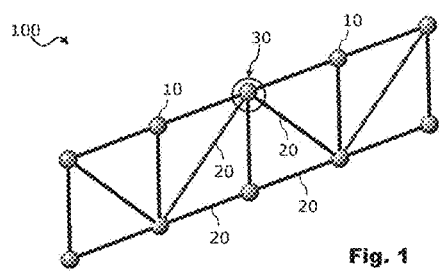
FIG. 1 schematically illustrates a framework assembly with rotary joints according to an embodiment of the disclosure herein.

In the figures, like reference numerals denote like or functionally like components, unless indicated otherwise. Any directional terminology like "top", "bottom", "left", "right", "above", "below", "horizontal", "vertical", "back", "front", and similar terms are merely used for explanatory purposes and are not intended to delimit the embodiments to the specific arrangements as shown in the drawings.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. Generally, this application is intended to cover any adaptations or variations of the specific embodiments discussed herein.

Some of the components, elements and assemblies as disclosed hereinforth may be fabricated using free form fabrication (FFF), direct manufacturing (DM), fused deposition modelling (FDM), powder bed printing (PBP), laminated object manufacturing (LOM), stereolithography (SL), selective laser sintering (SLS), selective laser melting (SLM), selective heat sintering (SHS), electron beam melting (EBM), direct ink writing (DIW), digital light processing (DLP) and/or additive layer manufacturing (AM). Those techniques belong to a general hierarchy of additive manufacturing (AM) methods. Often termed as 3D printing, those systems are used for generating three-dimensional objects by creating a cross-sectional pattern of the object to be formed and forming the three-dimensional solid object by sequentially building up layers of material. Any of such procedures will be referred to in the following description as AM or 3D printing without loss of generality. AM or 3D printing techniques usually include selectively depositing material layer by layer, selectively fusing or solidifying the material and removing excess material, if needed.

3D or AM techniques may be used in procedures for building up three-dimensional solid objects based on digital model data. 3D/AM employs an additive process where layers of material are sequentially built up in different shapes. 3D/AM is currently used for prototyping and distributed manufacturing with multiple applications in engineering, construction, industrial design, automotive industries and aerospace industries.

FIG. 1 shows a schematic illustration of a framework 100. The framework 100 comprises a multitude of laterally and diagonally running struts 20 which may be interconnected among each other at joint regions 30. Each of the joint regions 30 may have a rotary joint 10 that is connected to each of the end portions of the struts 20 reaching into the particular joint region 30. The framework 100 may have a generally two-dimensional layout, i.e. the struts 20 and joints 10 are substantially lying in one plane of extension which may be flat or arcuate. In the exemplary case of FIG. 1 the framework 100 takes on the shape of a frame having two substantially parallel beams (running from bottom left to top right in the drawing) formed by a first subset of the interconnection struts 20 and diagonally staggered crossbeams between the two substantially parallel beams formed by a second subset of the interconnection struts 20.

The framework 100 may also have a generally three-dimensional layout, i.e. for each first plane of extension defined by a subset of struts 20, another subset of struts 20 is connected to rotary joints 10 in a manner that defines at least one further second plane of extension being arranged under a non-zero angle with respect to the first plane of extension. Rotary joints as disclosed hereinforth generally denote spheroid joints or socket type joints where a stationary part having a generally spheroid or at least partly spheroid convex outer bearing surface is in sliding contact with a generally spheroid least partly spheroid concave counter-bearing surface of a hinged part. The stationary part may be a joint member, such as a bracket, fixture or holder, while the hinged and movable part may be a strut, rod or other truss element, such as a strut 20 as shown in FIG. 1.

The number of struts 20 being interconnected in each joint region 30 may vary and may in particular be not limited to the explicit number of two, three or five as exemplarily shown in FIG. 1. Specifically, the number of interconnecting struts 20 at each joint region 30 may take on any number greater than one. To that end, the rotary joints 10 employed at each joint region 30 may have a number of interconnection assemblies that is at least equal or greater than the number of interconnecting struts 20. Moreover, the kind, type and specific design of the rotary joints 10 may vary depending on the particular joint region 30 they are employed at.

Generally, a set of rotary joints 10 and a set of interconnecting struts 20 may form a framework construction kit which may be used to construct different frameworks of varying extension, size, shape and complexity. Thus, while it may be favourable to use as few different types of rotary joints 10 and as few different types of interconnecting struts 20 as possible to guarantee high flexibility in framework design and low implementation effort, it may as well be possible to use more different types of rotary joints 10 and/or interconnecting struts 20 in order to specifically be able to tailor the framework construction kit to the particular needs and constraints of the framework and its intended field of application.

The framework construction kits as disclosed hereinforth may be used in a lot of applications, including—but not limited to—constructions of frames, stringers and crossbeams in aircraft, interior design, bridge building, vehicle carriages, civil engineering, applications for children's toys and similar. A particular application pertains to the construction of frameworks in aircraft. Such frameworks include connection rods for bracing a fuselage structure of an aircraft, structurally reinforcing a fuselage structure and/or for fastening a component on the fuselage structure. Those connection rods are often referred to as "Samer rods" or "Samer-type rods" and generally have a central strut portion between two end portions used to interconnect the connection rod between two joints or brackets.

Conventional Samer rods generally have a hollow-cylindrical central portion that may taper towards the end regions. The end regions may have a shank and eyes arranged at shank ends on both sides for connecting the Samer rod to the fuselage structure. In order to link the Samer rod to the structure of the aircraft, a clamp or a forked bracket attached to the structure. The clamp (or bracket) has a bore which may align with the eye of a shank end so that a bolt introduced through the bore and the eye pivotably couples the Samer rod to the clamp (or bracket).

In contrast to such conventional Samer rods the linking mechanism of struts 20 as illustrated herein, the number of individual parts used for mechanically linking the struts 20 to a structure or framework, such as the framework 100, by way of rotary joints 10 is greatly reduced. Additionally, the usage of less individual parts for the struts 20 and the rotary joints 10 requires less effort in positioning the struts with respect to the brackets or clamps to which are to be fastened. This, in turn, leads to lower manufacturing costs and higher throughput in constructing frameworks.

Figure 5:
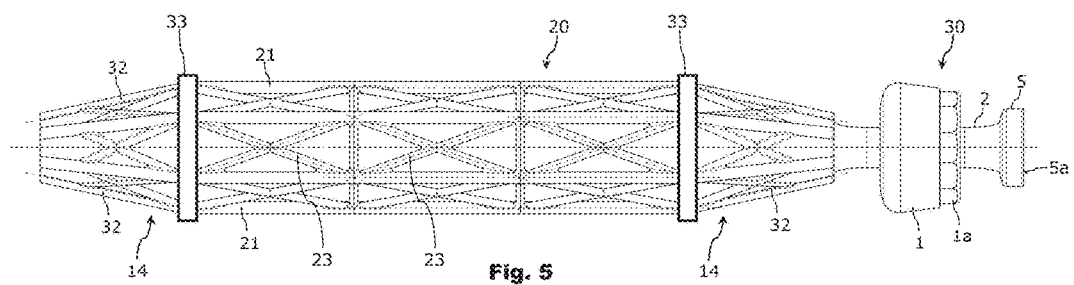
FIG. 5 schematically illustrates a front view of a connection strut with a connection part of a rotary joint according to another embodiment of the disclosure herein.
Figure 6:
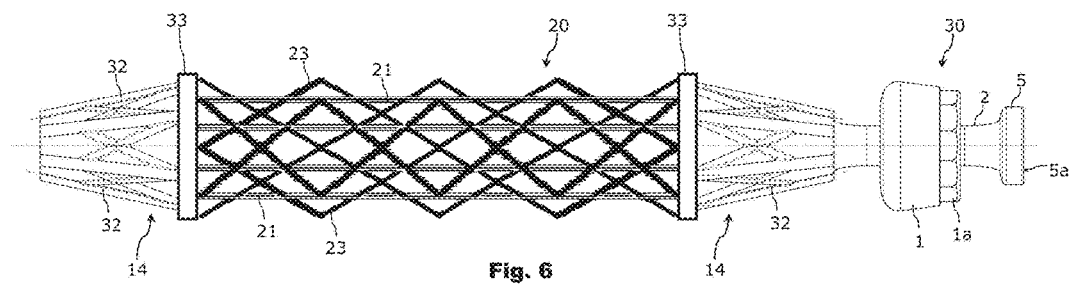
FIG. 6 schematically illustrates a front view of a connection strut with a connection part of a rotary joint according to another embodiment of the disclosure herein.
Figure 7:
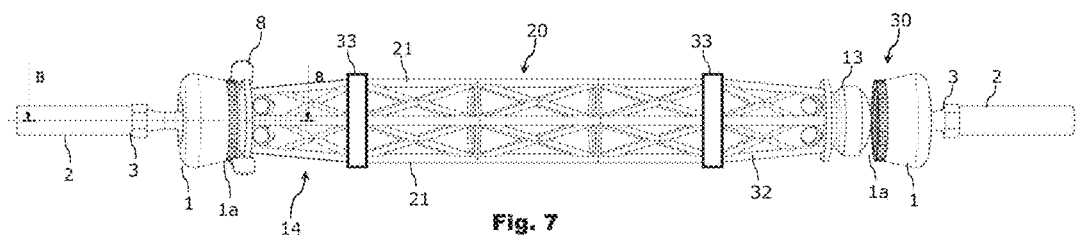
FIG. 7 schematically illustrates a front view of a connection strut with a connection part of a rotary joint according to yet another embodiment of the disclosure herein.
Figure 8:
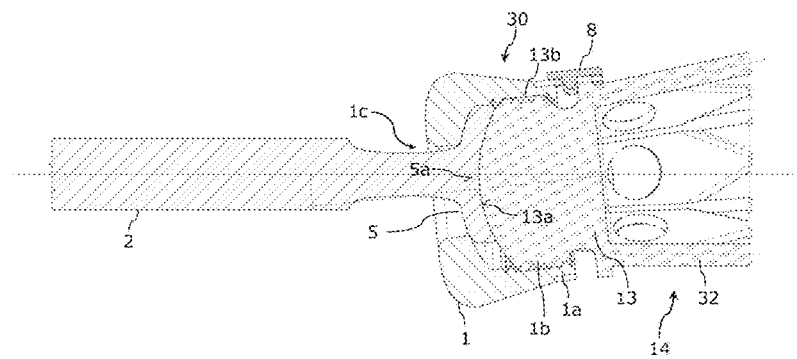
FIG. 8 schematically illustrates a cross-sectional view along the line B-B of FIG. 7.

The following FIGS. 2 to 6 exemplarily show schematic illustrations of a single strut 20 or connection rod as it may be used in a framework 100 of FIG. 1. The struts 20 exemplarily shown in FIGS. 2 to 6 may have different end portions, depending on the type of rotary joint 10 used and depending on whether two or more struts 20 are to be interconnected or a single strut is to be fastened to a clamp or bracket. In the FIGS. 7, 8 and 9, further illustrations of a single strut 20 or connection rod as it may be used in a framework 100 of FIG. 1 are shown. In contrast to the struts of FIGS. 2 to 6, the struts 20 of the FIGS. 7, 8 and 9 are connected to the ball rod 13 of the rotary joint 10 instead of the socket rod 2.

For each of the struts 20 as exemplarily illustrated and explained in conjunction with FIGS. 2 to 9, the core part of the strut 20 may be formed as a truss structure, i.e. a structure comprising or consisting of two-force members which are assembled in a three-dimensional structure and connected as nodes. Typically, such truss structures may comprise polygonal constructed with straight members the ends and sometimes intermediate portions of which are connected at truss nodes. One of such truss structures for the struts 20 that is explicitly shown in FIG. 6 as being used in a Samer rod, is explained in conjunction with FIG. 10.

The truss structure of FIG. 10 generally has an overall truss length T over which a plurality of longitudinal spanning chord members 21 extend. Between the straight chord members 21 a number of helically wound web members 23 interconnect the spanning chord members 21 at nodal points. The typical distance between two adjacent web members 23 along the extension of the strut 20 is denoted as bay length K in FIG. 10.

Figure 2:
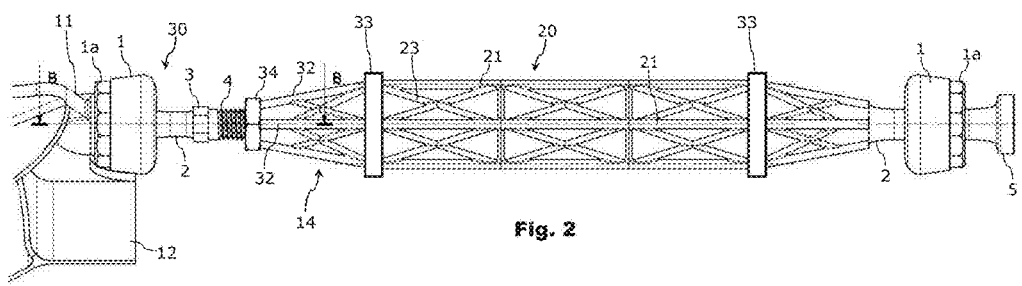
FIG. 2 schematically illustrates a front view of a connection strut with rotary joints according to another embodiment of the disclosure herein.
Figure 3:
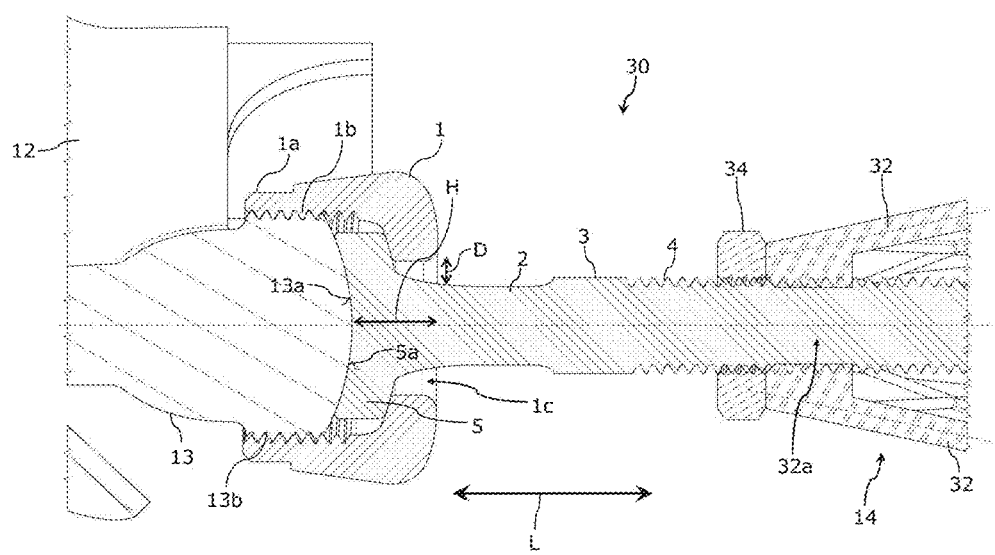
FIG. 3 schematically illustrates a cross-sectional view along the line B-B of FIG. 2 in a baseline position.
Figure 4:
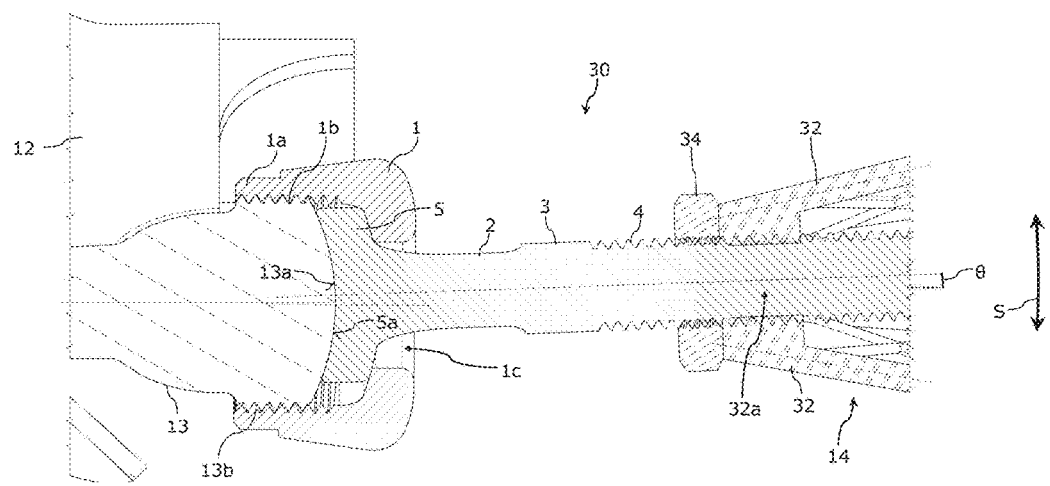
FIG. 4 schematically illustrates a cross-sectional view along the line B-B of FIG. 2 with the strut swivelled out of its baseline position.

FIG. 2 shows a front view of a connection strut 20 with rotary joint regions 30 at both strut ends. FIG. 3 schematically illustrates a cross-sectional view along the line B-B of FIG. 2 in a baseline position, whereas FIG. 4 schematically illustrates the cross-sectional view along the line B-B of FIG. 2 with the strut 20 swivelled out of its baseline position. In conjunction with FIGS. 2, 3 and 4, the left hand side rotary joint region 30 of a strut 20 is explained and shown in more detail.

FIG. 5 schematically illustrates a front view of a connection strut 20 with a connection part of a rotary joint 10 at its right hand side rotary joint region 30. Corresponding thereto, FIG. 6 schematically illustrates a front view of another connection strut 20 having a different truss structure from the one in FIG. 5, but equally equipped with a connection part of a rotary joint. In conjunction with FIGS. 5 and 6, the right hand side rotary joint region 30 of a strut 20 is explained and shown in more detail.

Again referring back to FIG. 2 in general, the left hand side rotary joint region 30 of the strut 20 includes a socket rod with a threaded adjustment stem that may be threadingly engaged with a correspondingly threaded mounting shank. On the contrary, the right hand side rotary joint region 30 of the strut 20 includes a socket rod with a locking stem that may be introduced in a force-fit or form-fit engagement with a counterlocking mounting shank. It should, however, be understood that the mounting shanks as exemplarily shown in the drawings do not need to have different types of engagement mechanisms on both ends of the strut 20. It may equally be possible to provide for mounting shanks on both ends of a strut 20 that have threadingly engaged adjustment stems at both ends or, alternatively, counterlocking mounting shanksin a force-fit or form-fit engagement with the locking stems of the socket rod at both ends of the strut 20. Moreover, it may be possible to provide for a mounting shank that is integrally manufactured with a corresponding socket rod of the rotary joint 10.

The rotary joint 10 comprises the socket rod 2, for example a generally cylindrical socket rod with a tapered middle portion. At a first end of the socket rod 2—the left hand side in the FIGS. 3 and 4—the socket rod 2 has a socket rod flange 5 attached thereto. The socket rod flange 5 may be integrally fabricated with the middle portion of the socket rod 2. The socket rod flange 5 has an at least partly spheroid concave bearing surface 5a at a first end, i.e. the bearing surface 5a has a curvature where the radius of the curvature lies outside the socket rod 2.

A generally cylindrical housing nut 1 encircles the socket rod 2 and has a threaded wrenching head 1a. The threaded wrenching head 1a may have an angular contour, for example a hex contour for a wrenching tool to grip thereon and exert a torque onto the housing nut 1. The housing nut 1 has an opening on the flange side of the socket rod 2 the diameter of which exceeds the diameter of the opening on the opposite side of the housing nut 1. In other words, the housing nut 1 has a nut hole 1c on the opposite side of the threaded wrenching head 1a, the diameter D of which is smaller than the diameter of the opening of the threaded wrenching head 1a. The threaded wrenching head 1a has a female-thread inner thread 1b formed on its inner walls.

The nut hole 1c is larger in diameter than the diameter of the socket rod 2 so that the housing nut 1 is able to be moved along a slip path L along the axis of extension of the socket rod 2. The socket rod flange 5, however, is formed with a larger diameter than the diameter D of the nut hole 1c so that the housing nut 1 may not slip off the socket rod 2 over the socket rod flange 5.

The rotary joint 10 further comprises a ball rod 13 that has a ball rod head with threaded side walls 13b and an at least partly spheroid convex bearing surface 13a, i.e. the bearing surface 13a has a curvature where the radius of the curvature lies inside the ball rod 13. The diameter of the threaded side walls 13b of the ball rod 13 corresponds to a diameter of the threaded wrenching head 1a of the housing nut 1. The curvature of the concave bearing surface 5a of the socket rod flange 5 particularly corresponds to the curvature of the convex bearing surface 13a of the ball rod 13, so that a smooth contacting area between the socket rod 2 and the ball rod 13 is guaranteed. For assembly of the rotary joint 10, the bearing surfaces 5a and 13a of the socket rod 2 and ball rod 13, respectively are brought into contact. Then, the housing nut 1 is guided over the socket rod flange 5 and threadingly engaged with the threaded side walls 13b of the ball rod 13. This provides a housing of the socket rod flange 5 between the inner hollow of the housing nut 1 and the ball rod 13.

The housing nut 1 is then tightened up to a point where the socket rod flange 5 is securely held in contact with the ball rod 13 at the respective contacting surfaces 5a and 13a. However, the tightening of the housing nut 1 is chosen in such a way that the socket rod flange 5 and the ball rod head are still able to move in sliding or swivelling motion S with respect to each other, as shown in FIG. 4. The swivelling motion S will displace the socket rod 5 out of axis of the ball rod 13 by a swivelling angle δ. The maximum possible swivelling angle θ will be determined by the ratio between the nut hole diameter D and the height H of the housing nut 1.

The ball rod 13 may generally be attached to any bearing structure 11, such as a bracket 12, a holder, a support beam or any other suitable structure. It may also be possible to provide more than one ball rod 13 with different directions of extension to the same bearing structure 11 in order to provide for an interconnection node for multiple struts 20.

The socket rod 2 of FIGS. 3 and 4—and as disclosed on the left hand side of FIG. 2—may have a threaded shank with a socket rod thread 4. The threaded shank may be located on an end portion opposite to the end portion having the socket rod flange 5. In the middle portion of the socket rod 5, a wrenching contour 3 may be arranged on the circumference of the socket rod 2. The wrenching contour 3 may for example be a series of angled surfaces, such as a hex, for wrenching tools to grip on the socket rod 2 and exert a torque on the socket rod 2 around its main axis of extension.

The threaded shank may be used for connecting the socket rod 2 to a mounting shank 14 of the rotary joint 10 which in turn may be coupled to an interconnection strut 20, such as for example a Samer rod. The mounting shank 14 may for this purpose have a corresponding female-threaded socket rod duct 32a located at a first end portion. The female-threaded socket rod duct 32a may be threadingly engaged with the threaded shank of the socket rod 2. Additionally, a strut wrenching head 24 may be provided on the end portion of the mounting shank 14 in order to have a structure for exerting a countering force to the torque exerted on the socket rod wrenching contour 3 when engaging the socket rod 2 with the mounting shank 14.

The threaded shank of the socket rod 2 advantageously allows for adjusting the distance by which the socket rod 2 protrudes from the mounting shank 14 and, hence, the strut 20, thereby enabling a framework constructed with rotary joints 10 and interconnection struts 20, such as a framework 100 of FIG. 1, to be flexibly designed with regard to strut lengths between different interconnecting nodes.

As shown in FIG. 5, the interconnection struts 20 themselves may comprise a trussed beam, for example built up with an isometric framework. Those trussed beams may for example include a plurality of substantially longitudinally running chord members 21 distributed around a central axis. A plurality of web members 23 may be provided, spanning between the chord members 21 in zig-zag, diagonal or otherwise grid-like manner. The central diameter of the trussed beams may in particular be larger than the diameter of the socket rods 2. Thus, it may be possible to provide the mounting shanks 14 as tapered elements with chord members 32 tapering from the strut end towards the socket rod end.

The mounting shanks 14 may also comprise a different mechanism for connecting with the socket rods 2. For example, at a second shank end portion, i.e. on the right hand side of FIGS. 5 and 6, the mounting shanks 14 may have a receptacle, for example located within the chord members 32. The socket rod 2 may in this case have snap-fit end portion 6, such as a slightly forked and resilient engagement member, that may be engaged in a snap-fit engagement with the mounting shanks 14.

In order to connect the rotary joint 10 to the interconnecting strut 20, the mounting shank 14 may be equipped with a joint connector ring 33 that is coupled to the strut connection end of the mounting shank 14. The joint connector ring 33 as illustrated in conjunction with the rotary joints of FIGS. 2, 5, 6 and 7 is illustrated in more detail in FIGS. 11 and 12. Specifically, FIG. 11 schematically illustrates a perspective view of a joint connector ring 22 as used in one of the joint regions 30 of FIGS. 2, 5, 6 and 7. FIG. 12 then illustrates a cross-sectional view through the joint connector ring 33 along the section line C-C as indicated in FIG. 11.

Particularly, the joint connector ring 33 may take on the outer shape of an annulus or a hollow cylinder with a connector body 35 being formed as hollow shell surrounding a connector hollow 36 or opening. The connector body 35 may for example be cast from resin or metal. It may for example be integrally formed with the mounting shank 14, for example by using an Additive Manufacturing (AM) technique. The connector body 35 may have a ring groove 37 formed as a trench within the connector body 35. The ring groove 37 may run circumferentially around the hollow cylinder having an approximately constant depth within the connector body 35.

The trench of the ring groove 37 may be used to provide a form fit for the spanning chord members 21 of an interconnecting strut 20 to be fastened to the mounting shank 14. To that end, the spanning chord members 21 may be pressed into the ring groove 37 so that the strut 20 and the mounting shank 14 are coupled together in a form-fit.

In order to securely fasten the strut 20 to the mounting shank 14, and thus the socket rod 2, the ring groove 37 may be filled with an adhesive such as for example resin, glue or liquid metal. Upon hardening, the strut 20 and the mounting shank 14 will be firmly fixed together. Alternatively, it may also be possible to provide the joint connector ring 33 with a snap-click interface geometry at its ring groove 37 so that the spanning chord members 21 when entering the ring groove 37 will interlock with the joint connector ring 37. The snap-click interface may for example be formed by forming locking recesses at the bottom of the trench formed by the ring groove 37 or by external locking pins or rings formed around the joint connector ring 37 that may be brought into interlocking form-fit with the web members 23 of the strut 20.

FIG. 7 schematically illustrates a front view of a connection strut 20 with a connection part of a rotary joint 10 at its left and right hand side rotary joint region 30. Corresponding thereto, FIG. 8 schematically illustrates a cross-sectional view along the line B-B of FIG. 7. In conjunction with FIGS. 7 and 8, the left hand side rotary joint region 30 of a strut 20 is explained and shown in more detail.

Similar to the rotary joints 10 of FIGS. 3 and 4, the rotary joint 10 of FIG. 8 comprises a socket rod 2, for example a generally cylindrical socket rod with a tapered middle portion. At a first end of the socket rod 2—the right hand side in the FIG. 8—the socket rod 2 has a socket rod flange 5 attached thereto. The socket rod flange 5 may be integrally fabricated with the middle portion of the socket rod 2. The socket rod flange 5 has an at least partly spheroid concave bearing surface 5a at a first end, i.e. the bearing surface 5a has a curvature where the radius of the curvature lies outside the socket rod 2.

The rotary joint 10 of FIG. 8 further comprises a ball rod 13 that has a ball rod head with threaded side walls 13b and an at least partly spheroid convex bearing surface 13a, i.e. the bearing surface 13a has a curvature where the radius of the curvature lies inside the ball rod 13. The diameter of the threaded side walls 13b of the ball rod 13 corresponds to a diameter of the threaded wrenching head 1a of the housing nut 1. The curvature of the concave bearing surface 5a of the socket rod flange 5 particularly corresponds to the curvature of the convex bearing surface 13a of the ball rod 13, so that a smooth contacting area between the socket rod 2 and the ball rod 13 is guaranteed. For assembly of the rotary joint 10 in FIG. 8, the bearing surfaces 5a and 13a of the socket rod 2 and ball rod 13, respectively are brought into contact. Then, the housing nut 1 is guided over the socket rod flange 5 and threadingly engaged with the threaded side walls 13b of the ball rod 13. This provides a housing of the socket rod flange 5 between the inner hollow of the housing nut 1 and the ball rod 13.

In contrast to the rotary joints 10 of FIGS. 3 and 4, however, the rotary joint 10 of FIG. 8 has its ball rod 13 connected to an interconnection strut 20. For example, the ball rod 13 may be formed integrally at an end portion of the strut 20. When the housing nut 1 is threadingly engaged with the threaded side walls 13b of the ball rod 13, a clamping bracket 8, for example an annular clamping bracket sleeving the ball rod 13 and the end portion of the strut 20 at least partially, may be affixed to the rotary joint 10. This further secures the positioning of the housing nut 1 with respect to the strut 20 and prevents the housing nut 10 from accidentally coming loose due to vibrations or other mechanical strain.

FIG. 9 shows a rotary joint 10 similar to the rotary joint 10 of FIG. 8 where an additional sliding washer 7, such as an annular disk with a spheroid curvature matching the curvature of the socket rod flange 5 is introduced in the space between the socket rod flange 5 and the inner walls of the threaded side walls 13b of the ball rod 13. The sliding washer 7 may have a smaller diameter than the socket rod flange 5, but a larger diameter than the socket rod side of the housing nut 1. That way, the sliding washer 7 will allow for more leeway for the socket rod flange 5 to move along the ball rod surface 13a, but will prevent the socket rod flange 5 from slipping out of the housing nut 1. Such a sliding washer 7 may increase the maximum swivelling angle $\theta$ of the swivelling cone between the socket rod 2 and the ball rod 13.

The function of the rotary joints 10 as shown and explained in conjunction with FIGS. 2 to 9 is to divert torsional moments acting on the struts 20 lateral to their main axis. Since the struts are able to swerve or give way along the contacting surfaces 5a and 13a of the ball-and-socket bearing, this swivelling motion of the struts 20 will always be able to compensate for any lateral moments acting on the struts 20. Thus, the force lines running along the main axis of the struts 20 will always intersect at the same force line intersection point in the centre of the rotary joint 10, thereby not creating any net moment on the rotary joint 10 as a whole. As a consequence, the rotary joint 10 is free from torsional stress, leading to greater mechanical stability.

The framework construction kit as described as explained above is a cheap, extremely light and flexible system that allows for rapid construction and deconstruction of multiple structures of varying outer profile. The framework construction kit may for example be used to build bending beams that are essentially free from torsional moments in the interconnection joints. It allows for tolerance compensation and adjustment to flexible surfaces such as aircraft flaps or wings.

A particular advantage of the framework construction kit as disclosed, and in particular of the rotary joint 10 is the possibility to manufacture all parts using a 3D printing or an Additive Manufacturing (AM) technique. Particularly the joints 10 may be 3D printed with the housing nut 1 already manufactured seamlessly around the socket rod 2. This leads to an advantageous mechanical stability of the rotary joint 10.

A method for manufacturing a rotary joint, such as a rotary joint 10 as described in conjunction with FIGS. 2 to 9, comprises in a first step integrally forming a socket rod 2 having a socket rod flange 5 with an at least partly spheroid concave bearing surface 5a at a first end together with a housing nut 1, the housing nut 1 encircling the socket rod 2 and having a threaded wrenching head 1a. This first step may in particular be performed using a 3D printing or additive manufacturing, AM, technique. Then, in a second step, a ball rod 13 having an at least partly spheroid convex bearing surface 13a and threaded side walls around the bearing surface 13a is formed, using a 3D printing or additive manufacturing, AM, technique as well.

Finally, the threaded wrenching head 1a of the housing nut 1 is threadingly engaged with the threaded side walls of the ball rod 13 in a third step. In this manner, the socket rod flange 5 is housed between the housing nut 1 and the ball rod 13 and restrained from any other motion than a swivelling motion in a swivelling cone with respect to the contacting surfaces 5a and 13a. Optionally, a sliding washer 7 may be introduced between the socket rod flange 5 and the inner walls of the threaded wrenching head 1 a before threadingly engaging the threaded wrenching head 1a of the housing nut 1 with the threaded side walls of the ball rod 13. The sliding washer 7 may have a smaller diameter than the socket rod flange 5, but a larger diameter than the socket rod side of the housing nut 1. That way, the sliding washer 7 will allow for more leeway for the socket rod flange 5 to move along the ball rod surface 13a, but will prevent the socket rod flange 5 from slipping out of the housing nut 1. Such a sliding washer 7 may increase the maximum swivelling angle of the swivelling cone between the socket rod 2 and the ball rod 13.

The rotary joint 10, the frameworks 100 making use of such rotary joints 10 and the methods for manufacturing those rotary joints 10 reduce the number of individual parts necessary for the formation and functionality of the rotary joints 10 to a minimum. On one hand, the installation effort for such joints is minimized—on the other hand, the design precision in alignment of the individual parts advantageously decrease with the reduction in part count.

In the foregoing detailed description, various features are grouped together in one or more examples or examples with the purpose of streamlining the disclosure. It is to be understood that the above description is intended to be illustrative, and not restrictive. It is intended to cover all alternatives, modifications and equivalents. Many other examples will be apparent to one skilled in the art upon reviewing the above specification.

The embodiments were chosen and described in order to best explain the principles of the disclosure herein and its practical applications, to thereby enable others skilled in the art to best utilize the disclosure herein and various embodiments with various modifications as are suited to the particular use contemplated. In the appended claims and throughout the specification, the terms "including" and "in which" are used as the plain-English equivalents of the respective terms "comprising" and "wherein," respectively. Furthermore, "a" or "one" does not exclude a plurality in the present case.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

What is claimed is:

1. A rotary joint, comprising:
a socket rod having a socket rod flange with an at least partly spheroid concave bearing surface at a first end;
a housing nut encircling the socket rod and having a threaded wrenching head;
a ball rod having an at least partly spheroid convex bearing surface and threaded side walls around the bearing surface;
a mounting shank coupled to the socket rod or the ball rod with a shank end portion; and
a joint connector ring comprising a connector body formed as a hollow cylinder surrounding a connector opening and an annular groove formed in a top surface of the cylindrical connector body as a trench running circumferentially around the cylindrical connector body and having an approximately constant depth within the connector body, the joint connector ring being fixedly connected to the mounting shank opposite to the shank end portion,
a diameter of the threaded side walls of the ball rod corresponding to a diameter of the threaded wrenching head of the housing nut, wherein a curvature of the concave bearing surface of the socket rod flange corresponds to a curvature of the convex bearing surface of the ball rod.

2. The rotary joint of claim 1, wherein the housing nut has a nut hole on an opposite side of the threaded wrenching head, a diameter of the nut hole being larger than a diameter of the socket rod, but smaller than a diameter of the socket rod flange.

3. The rotary joint of claim 1, further comprising:
a sliding washer arranged between the socket rod flange and inner walls of the threaded wrenching head.

4. A framework construction kit, comprising:
at least one rotary joint comprising:
a socket rod having a socket rod flange with an at least partly spheroid concave bearing surface at a first end;
a housing nut encircling the socket rod and having a threaded wrenching head;
a ball rod having an at least partly spheroid convex bearing surface and threaded side walls around the bearing surface;
a mounting shank coupled to the socket rod or the ball rod with a shank end portion; and
a joint connector ring comprising a connector body formed as a hollow cylinder surrounding a connector opening and an annular groove formed in a top surface of the cylindrical connector body as a trench running circumferentially around the cylindrical connector body and having an approximately constant depth within the connector body, the joint connector ring being fixedly connected to the mounting shank opposite to the shank end portion,
a diameter of the threaded side walls of the ball rod corresponding to a diameter of the threaded wrenching head of the housing nut; and
at least one tubular interconnection strut connected to the joint connector ring, wherein a curvature of the concave bearing surface of the socket rod flange corresponds to a curvature of the convex bearing surface of the ball rod.

5. The framework construction kit of claim 4, wherein the at least one interconnection strut comprises a trussed beam having a plurality of substantially longitudinally running chord members and a plurality of web members spanning between the chord members.

6. The framework construction kit of claim 4, wherein tube walls of the tubular interconnection strut are inserted into the annular groove of the joint connector ring in a form-fit or press-fit arrangement.

7. The framework construction kit of claim 6, wherein the tubular interconnection strut is fixedly secured to the joint connector ring by resin, adhesive, glue or solidified liquid metal introduced into the annular groove.

8. The framework construction kit of claim 6, wherein the tubular interconnection strut is fixedly secured to the joint connector ring by a snap-lock mechanism.

9. A framework, comprising:
a plurality of rotary joints comprising:
a socket rod having a socket rod flange with an at least partly spheroid concave bearing surface at a first end;
a housing nut encircling the socket rod and having a threaded wrenching head;
a ball rod having an at least partly spheroid convex bearing surface and threaded side walls around the bearing surface;
a mounting shank coupled to the socket rod or the ball rod with a shank end portion; and
a joint connector ring comprising a connector body formed as a hollow cylinder surrounding a connector opening and an annular groove formed in a top surface of the cylindrical connector body as a trench running circumferentially around the cylindrical connector body and having an approximately constant depth within the connector body, the joint connector ring being fixedly connected to the mounting shank opposite to the shank end portion,
a diameter of the threaded side walls of the ball rod corresponding to a diameter of the threaded wrenching head of the housing nut, the rotary joints being attached to a plurality of bearing structures; and
a plurality of interconnection struts, each connected to the joint connector rings of the plurality of rotary joints, wherein a curvature of the concave bearing surface of the socket rod flange corresponds to a curvature of the convex bearing surface of the ball rod.

* * * * *